US012397927B2

(12) United States Patent
Rochin Machado et al.

(10) Patent No.: US 12,397,927 B2
(45) Date of Patent: Aug. 26, 2025

(54) AIRCRAFT TRANSPORTATION FOR MOBILE POWER GENERATION PACKAGES

(71) Applicant: GENERAL ELECTRIC COMPANY, Schenectady, NY (US)

(72) Inventors: Jorge Mario Rochin Machado, Queretaro (MX); David Garza Maldonado, Queretaro (MX); Erick Alexis Dominguez Ortiz, Queretaro (MX); Michael A. Acosta, Baytown, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 384 days.

(21) Appl. No.: 18/192,473

(22) Filed: Mar. 29, 2023

(65) Prior Publication Data
US 2024/0327033 A1 Oct. 3, 2024

(51) Int. Cl.
*B64F 1/00* (2024.01)
*B64D 9/00* (2006.01)
*B64F 1/32* (2006.01)
*B66D 1/60* (2006.01)

(52) U.S. Cl.
CPC ............... *B64F 1/326* (2020.01); *B64D 9/00* (2013.01); *B66D 1/60* (2013.01)

(58) Field of Classification Search
CPC .. B64F 1/326; B64D 9/00; B66D 1/60; B66D 3/00
See application file for complete search history.

(56) References Cited

U.S. PATENT DOCUMENTS

| | | | |
|---|---|---|---|
| 3,727,581 A | | 4/1973 | Brent |
| 4,265,588 A | * | 5/1981 | Oshel ...................... B64D 9/00 414/500 |
| 8,015,925 B2 | | 9/2011 | Simon |
| 9,802,584 B2 | | 10/2017 | Sethi |
| 9,809,308 B2 | | 11/2017 | Aguilar et al. |
| 10,634,029 B2 | | 4/2020 | Czarnecki et al. |
| 10,784,658 B2 | * | 9/2020 | Rochin Machado ..... B60P 3/00 |
| 11,143,000 B2 | * | 10/2021 | Li ........................ H02K 7/1823 |
| 2003/0057704 A1 | * | 3/2003 | Baten ..................... F02B 63/04 290/3 |

FOREIGN PATENT DOCUMENTS

EP 0 196 923 A1 10/1986

OTHER PUBLICATIONS

Extended European Search Report for EP 24161492.4, dated Aug. 12, 2024 (10 pp.).

* cited by examiner

*Primary Examiner* — Steven O Douglas
(74) *Attorney, Agent, or Firm* — Eversheds Sutherland (US) LLP

(57) ABSTRACT

The present application provides a mobile power plant system for loading power generation equipment into an aircraft via a winch cable and secured within the aircraft via a number of aircraft restraints. The mobile power plant system includes a trailer with the power generation equipment thereon, a number of hooks attached to the trailer, a winching beam attached to the trailer, and one or more winching shackles attached to the winching beam. The winch cable may be attached to the winching shackles to pull the trailer into the aircraft and the aircraft restraints may be attached to the hooks to secure the trailer in the aircraft.

20 Claims, 8 Drawing Sheets

AIRCRAFT TRANSPORTATION FOR MOBILE POWER GENERATION PACKAGES

TECHNICAL FIELD

The present application and the resultant patent relate generally to mobile power generation packages and more particularly relate to systems and methods for transporting and installing mobile power generation packages at remote locations.

BACKGROUND

Permanent power plants are built to provide power to customers connected to a power grid. However, there are a variety of reasons that the permanent power plant may not be able to meet the power demands of the customers. For example, in periods of significant growth, the demand by customers may increase to surpass the amount of power that the permanent power plant can generate. In some cases, the permanent plant may be shut down to undergo equipment maintenance. Likewise, blackouts, brownouts, or natural disasters such as a flood, hurricane, earthquakes, and the like may disrupt power production. As a result, mobile power plants may be transported to a location to meet the local power demands of customers when permanent power plants may not be able to deliver power or may not be able to deliver power efficiently. However, environmental issues, such as wind and seismic conditions, may prohibit the installation or operation of mobile power plants. Likewise, the mobile power plant must be well secured during transport, particularly via aircraft when turbulence and the like may be an issue.

SUMMARY

The present application and the resultant patent thus provide a mobile power plant system for loading power generation equipment into an aircraft via a winch cable and secured within the aircraft via a number of aircraft restraints. The mobile power plant system includes a trailer with the power generation equipment thereon, a number of hooks attached to the trailer, a winching beam attached to the trailer, and one or more winching shackles attached to the winching beam. The winch cable may be attached to the winching shackles to pull the trailer into the aircraft and the aircraft restraints may be attached to the hooks to secure the trailer in the aircraft.

The present application and the resultant patent further provide a method of method of transporting a mobile power plant system to a remote location. The method may include the steps of winching a trailer of the mobile power plant system into an aircraft, securing the trailer with a number of aircraft restraints within the aircraft, driving the trailer to the remote location, and securing the trailer to a foundation of the remote location via a number of turnbuckles attached to the trailer and to the foundation.

The present application and the resultant patent further provide a mobile power plant system for transporting power generation equipment via an aircraft and securing the power generation equipment at a remote location. The mobile power plant system may include a trailer with the power generation equipment thereon, a number of hooks attached to the trailer, a winching beam with one or more winching shackles attached to the trailer, and a tensile restraint with a turnbuckle attached to each of the hooks. A winch cable may be attached to the winching shackles to pull the trailer into the aircraft and the tensile restraint with the turnbuckle secures the trailer to the remote location.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
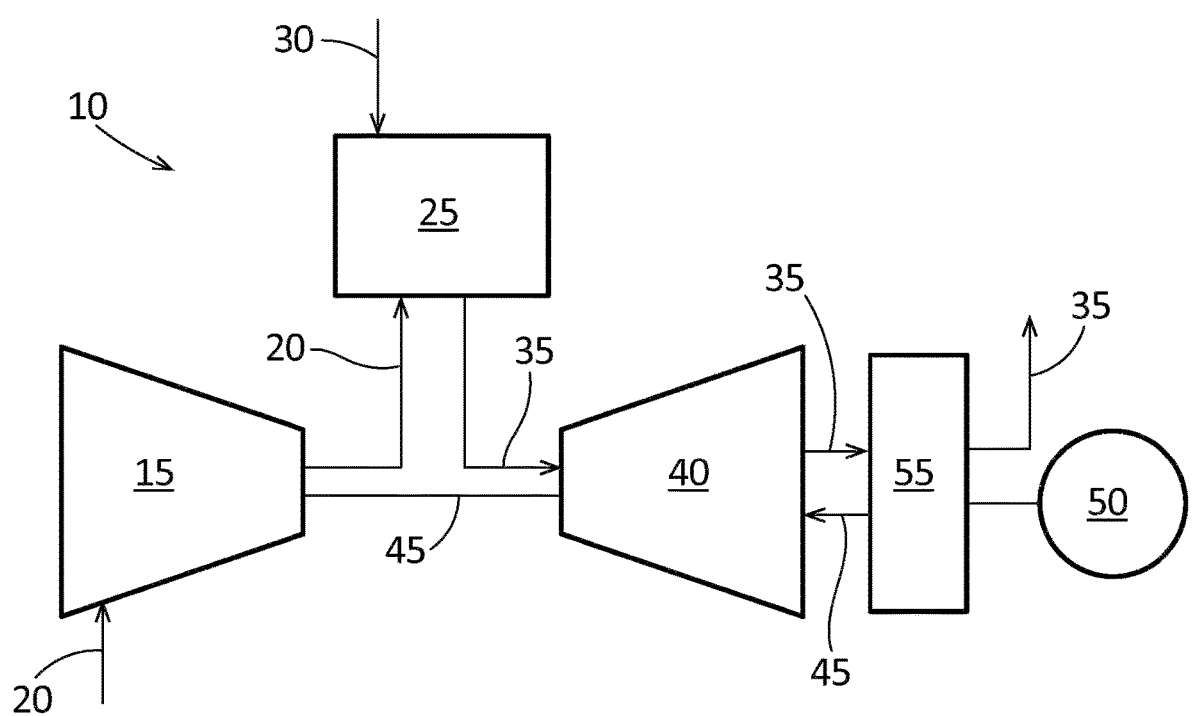
FIG. 1 is a schematic diagram of a gas turbine engine including a compressor, a combustor, a turbine, an external load in the form of a generator, and an exhaust frame.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45 and an external load such as an electrical generator 50 and the like.

The flow of combustion gases 35 is delivered from the turbine 40 to an exhaust frame 55 positioned downstream thereof in the form of spent flue gases. The exhaust frame 55 may contain and direct the flow of the flue gases to other components of the gas turbine engine 10. For example, the exhaust frame 55 may direct the flow of the flue gases to an exhaust plenum or an exhaust diffuser. Other configurations and other components may be used herein.

Figure 2:
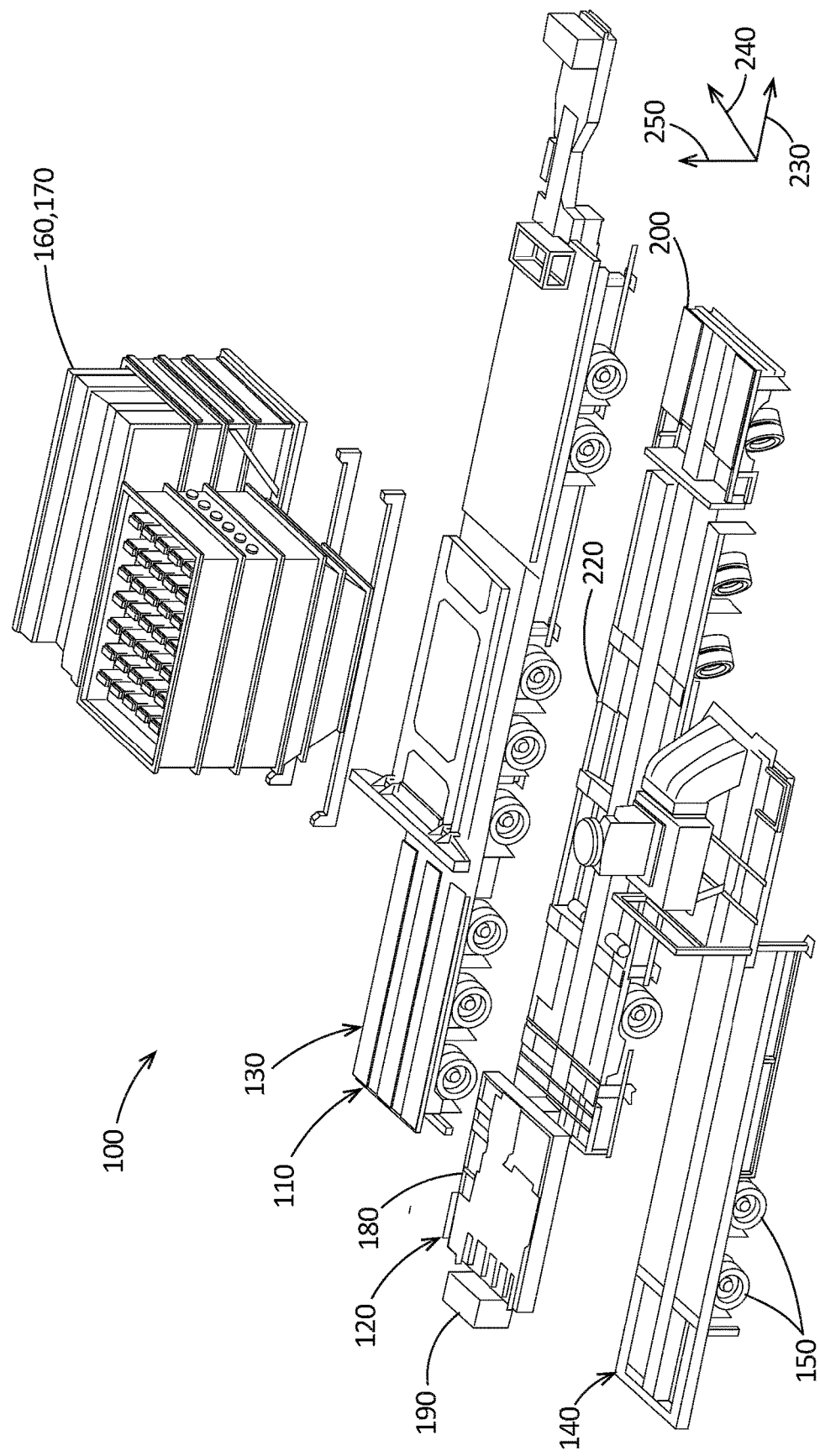
FIG. 2 is a perspective view of a mobile power plant as may be described herein.

FIG. 2 is a perspective view of an exemplary mobile power plant system 100 as may be described herein. The mobile power plant system 100 may a number of trailers 110. In this example, a turbine trailer 120, a generator trailer 130, and a control house trailer 140 are shown. Other types of trailers 110 may be used herein in any number, size, or configuration. Each trailer 110 may be configured to transport one or more of the power generation components of the mobile power plant system 100 to an installation site. Specifically, one or more of the trailers 110 may be coupled to tractors or trucks to be transported to the installation site. Accordingly, each of the trailers 110 may include a number of wheels 150 disposed thereon to enable efficient transportation and installation. Likewise, the one or more trailers 110 may be transported via aircraft and the like to a location near the installation site, as further described in detail below. Movement of the one or more components of the mobile power plant system 100 via the trailers 110 and/or aircraft may allow for quicker installation time, lower installation cost, and greater overall mobility.

The turbine trailer 120 may be configured to transport the gas turbine engine 10 or components thereof. Although a gas turbine is shown, the turbine may be a steam turbine, a hydroturbine, a wind turbine, or any turbine system or other type of power generation equipment. Related components, such as an air intake section 160 with a filter assembly 170 also may be mounted on the turbine trailer 120 or elsewhere. The filter assembly 170 may be configured to filter and intake the air flow into the gas turbine engine 10. Likewise, an auxiliary skid 180 may be disposed at a first end 190 (e.g., opposite a second end 200) of the turbine trailer 120. Additional support systems, such as a lubrication system, a water wash system, hydraulics system, a fluid injection system, a coolant system, a fuel system, a thermal/clearance system, and the like also may be disposed on the turbine trailer 120 and may be coupled or integrated within the gas turbine engine 10. An exhaust stack (e.g., a conduit, a silencer, and emissions control equipment) may be coupled to the exhaust frame 55 of the gas turbine engine 10 and may be configured to discharge the spent exhaust gases from the gas turbine engine 10. Other components and other configurations may be used herein.

As described above, the turbine 40 of the gas turbine engine 10 may drive an external load such as a generator 50. The generator 50 may be mounted on the generator trailer 130. Various other types of components such as a switch gear to connect the generator 50 to the power grid, a heat exchanger configured to cool generator lube oil, and the like may be mounted on the generator trailer 130. Other components and other configurations may be used herein.

The control house trailer 140 may include a control system configured to monitor and/or regulate the operations of the mobile power plant system 10. For example, the control house trailer 140 may include a control house, a battery system, a fire suppression system, a charging system, and/or other systems for controlling or regulating the operations of the mobile power plant system 10. Other components and other configurations may be used herein.

The turbine 40 of the gas turbine engine 10 may be removably coupled to the generator 50 via the common rotor shaft 45. During an installation phase, the generator 50 may be aligned with the turbine 40 via the generator trailer 130 and the turbine trailer 120. A number of restraint assemblies 220 may be coupled to the trailers 110 of the mobile power plant system 100 to maintain alignment of the generator 50 with the turbine 40 despite external loads on the system that may vary over time. The rotor shaft 45 may be oriented along a system axis 230. The restraint assemblies 220 may be configured to reduce or eliminate movement of the trailers 110 along the system axis 230, one or more lateral axes 240 along a surface of the installation site, along a vertical axis 250, or any combination thereof. For example, the restraint assemblies 220 may be configured to limit movement of the turbine trailer 120 relative to the generator trailer 130 to maintain alignment of the rotor shaft 45 and the like.

Additionally, the restraint assemblies 220 may be configured to reduce or eliminate movement of the trailers 110 relative to the installation site. The restraint assemblies 220 may be coupled to the trailers 110 to maintain a position of the trailers 110 on the one or more foundations at the installation site relative to other components despite external loads (e.g., wind loads, seismic loads) thereon. The restraint assemblies 220 may enable the mobile power plant system 100 to operate despite environmental conditions (e.g., winds of 30, 60, 90, or 120 mph or more; seismic events of 0.1 g, 0.25 g, 0.5 g, 0.65 g, or more) that may cause the shutdown of conventional mobile power systems. Moreover, the restraint assembly 220 may enable the mobile power plant system 10 to satisfy one or more building codes for static structures. Likewise, the restraint assemblies 220 and similar restraints may secure the trailers 110 during loading onto an aircraft and during transport on the aircraft. Specifically, the restraint assemblies 220 and similar restraints may secure the trailers 110 during significant turbulence and the like as is described in more detail below.

The restraint assemblies 220 may include one or more types of restraints. For example, the restraint assembly 220 may include one or more tensile restraints 260, one or more fastened restraints 270, or any combination thereof. Other types of restraint assemblies 220 may be used herein. The restraint assemblies 220 may couple portions of the trailers 110, such a trailer deck 290 or areas adjacent thereto, to one or more foundations 300 at the installation site and/or to any number of cables or other types of restraints on an aircraft.

Figure 3:
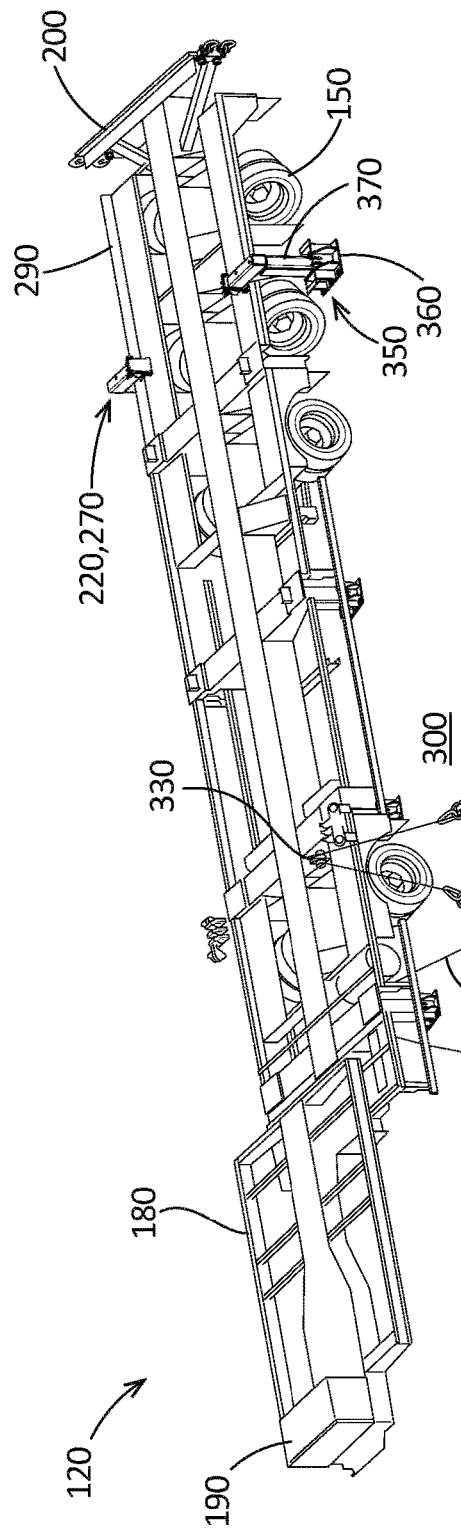
FIG. 3 is a perspective view of a turbine trailer of the mobile power plant in installation mode.
Figure 4:
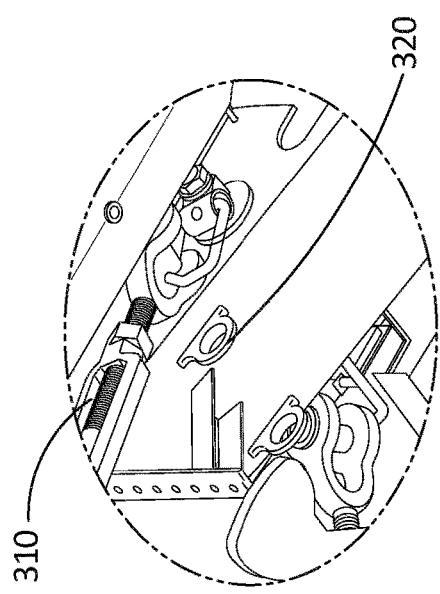
FIG. 4 is a perspective view of a tensile restraint and hooks of the turbine trailer of FIG. 3.

The trailers 110 thus may use the restraint assemblies 220 at the installation site for seismic, wind, and other environmental conditions as well as during transport, particularly during transport via aircraft and the like. FIG. 3 shows the turbine trailer 120 at the installation site, i.e., in installation mode. The turbine trailer 120 may use a number of the tensile restraints 260 positioned about the first end 190 thereof and elsewhere. Each of the tensile restraints 260 may include a turnbuckle 310. The turnbuckle 310, i.e., a stretching screw or bottlescrew, is a device for adjusting the tension or length of ropes, cables, tie rods, and/or other types or restraints or tensioning systems. As is shown in FIG. 4, the turnbuckle 310 may be attached at one end to the deck 290 via a hook 320 welded thereabout and/or to a welding plate 330. Likewise, the turnbuckle 310 may be attached at the other end to an anchor plate 340. The anchor plate 340 may be secured to the foundation 300 by fasteners or other conventional means. Once attached, the turnbuckle 310 may be tightened to the appropriate tension. Although four tensile restraints 260 are shown on each side of the turbine trailer 120, any number may be used herein.

Figure 5:
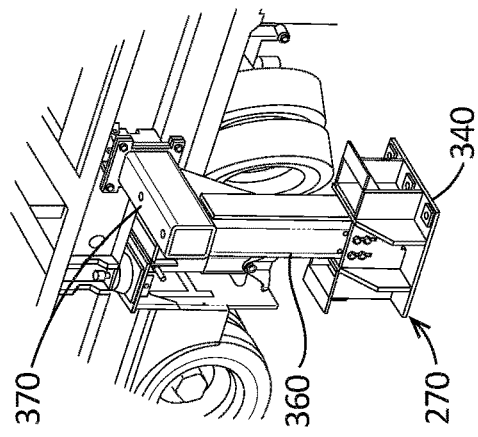
FIG. 5 is a perspective view of a fastened restraint of the turbine trailer of FIG. 3.

The turbine trailer 120 also may use a number of the fastened restraints 270 about the second end 200 thereof and elsewhere. As is shown in FIG. 5, the fastened restraints 270 may have one or more rigid elements 350 attached to an anchor plate 340 on a first end 190 and to the deck 290 or adjacent areas of the turbine trailer 120 on the second end 200. In this example, a first rigid member 360 may be coupled to the anchor plate 340 or the flanges thereof. The anchor plate 340 may be fastened to the foundation 300 in a conventional manner. A second rigid member 370 may be coupled to the first rigid member 360, may extend in a largely perpendicular direction, and may be fastened to the turbine trailer 120. Although two of the fastened restraints 270 are shown, any number may be used herein. Other configurations and other components may be used herein.

Figure 6:
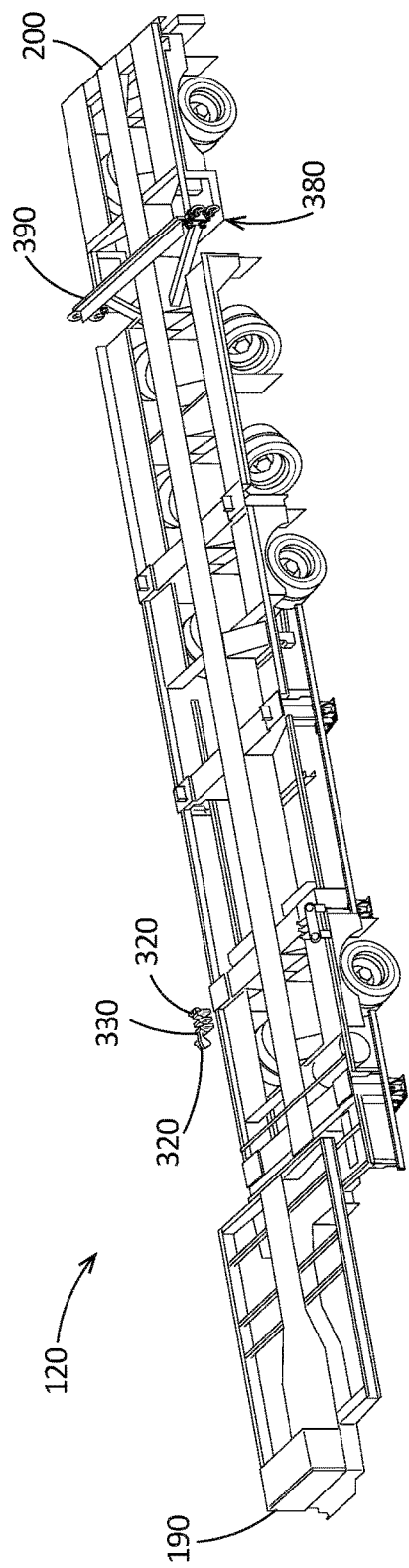
FIG. 6 is a perspective view of the turbine trailer of the mobile power plant in aviation mode.

FIG. 6 shows the turbine trailer 120 in an aircraft, i.e., in aviation mode. The turbine trailer 120 may use several of the hooks 320 welded thereto such as those shown in FIG. 4 as well as the hooks 320 attached to the welding plates 330 positioned about the first end 190 and elsewhere. The hooks 320 act as lashing points within the aircraft. The turbine trailer 120 thus uses those hooks 320 intended for the installation mode as well as dedicated hooks 320 for the aviation mode. As will be described in more detail below, the turbine trailer 120 may be secured via aircraft restraints 325 such as cables 440, the turnbuckles 310, and the like.

Figure 7:
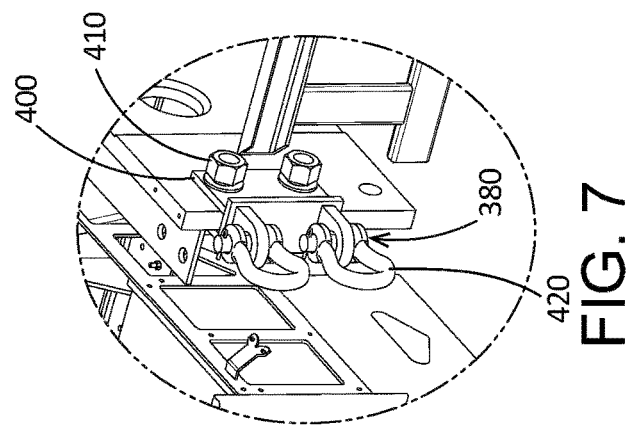
FIG. 7 is a perspective view of a winching shackle of the turbine trailer of FIG. 6.

The turbine trailer 120 also may include a pair or more of winching shackles 380 positioned about the second end 200 thereof. As is shown in FIG. 7, the winching shackles 380 may be attached to a winching beam 390 via one or more baseplates 400 and fasteners 410. On or more shackles 420 may be attached and supported by the baseplates 400. The winching shackles 380 may be sized to be attached to a winch cable 395 so as to pull the turbine trailer 120 at an angle into an aircraft and the like. Other components and other configurations may be used herein.

Figure 8:
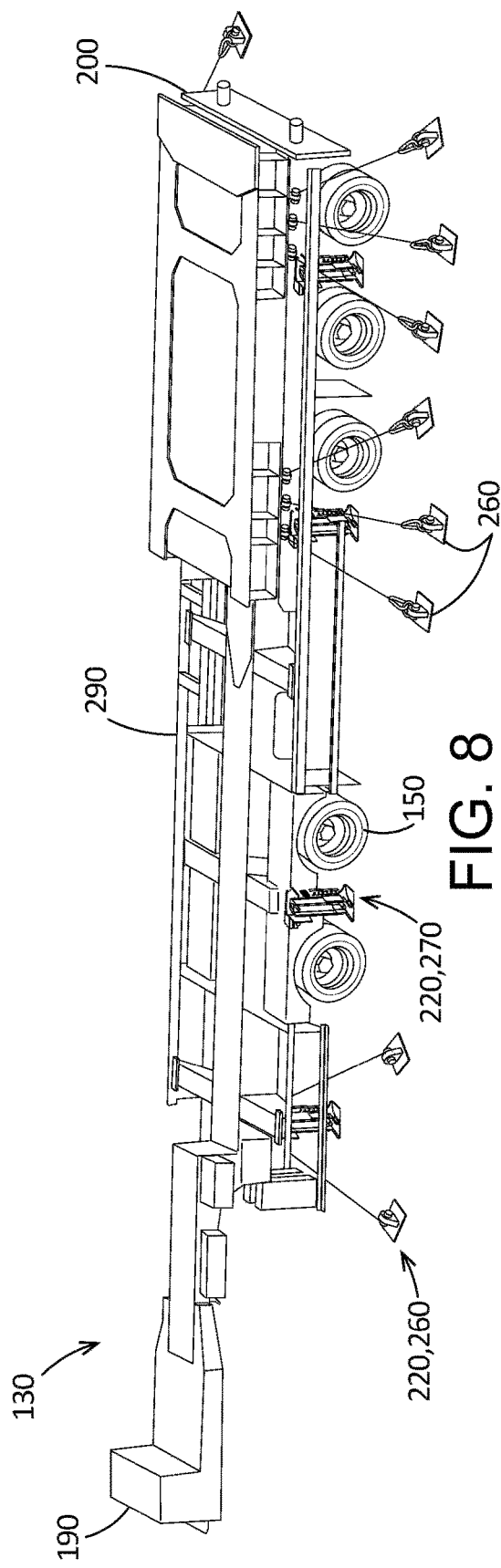
FIG. 8 is a perspective view of a generator trailer of the mobile power plant in installation mode.
Figure 10:
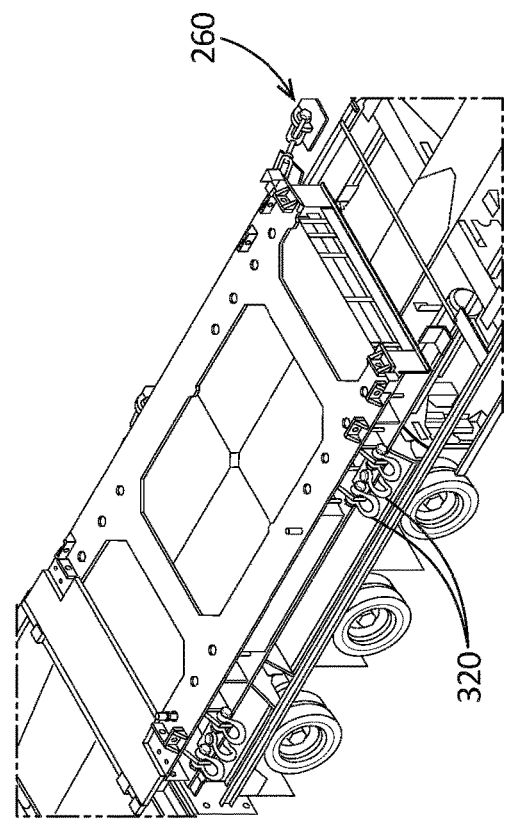
FIG. 10 is a perspective view of the tensile restraint and hooks of the generator trailer of FIG. 8.
Figure 9:
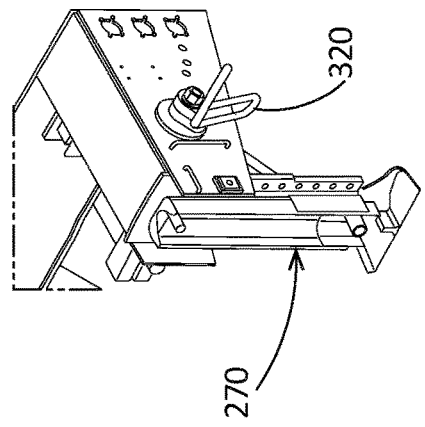
FIG. 9 is a perspective view of a tensile restraint with a hook of the generator trailer of FIG. 8.

FIG. 8 shows the generator trailer 130 at the installation site, i.e., in installation mode. The generator trailer 130 also may use a number of the tensile restraints 260. As described above, the tensile restraints 260 may include the turnbuckles 310. As is shown in FIGS. 9 and 10, the generator trailer 130 may have a number hooks 320 or other structures welded to the deck 290 or adjacent thereto. The turnbuckles 310 may be attached to the hooks 320 and to the anchor plates 340 and tightened. Any number of the tensile restraints 260 may be used herein. Likewise, the generator trailer 130 also may use a number of the fastened restraints 270 or similar structures. Other configurations and other components may be used herein.

Figure 11:
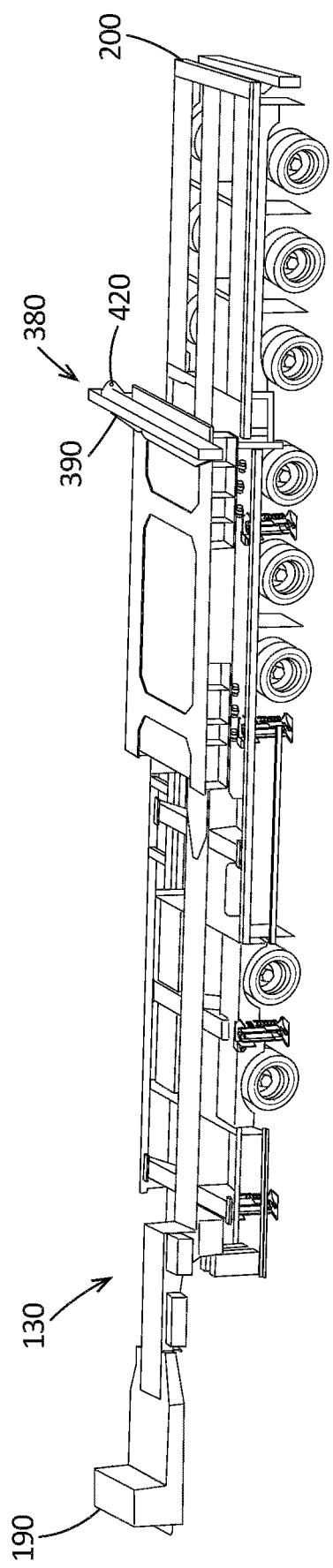
FIG. 11 is a perspective view of the generator trailer of the mobile power plant in aviation mode.
Figure 12:
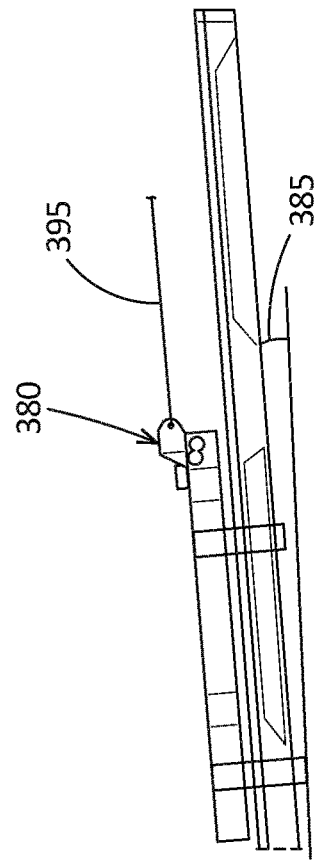
FIG. 12 is a perspective view of a winching shackle of the generator trailer of FIG. 11.

FIG. 11 shows the generator trailer 130 in an aircraft, i.e., in aviation mode. The generator trailer 130 may use several of the hooks 320 welded thereto as lashing points within the aircraft. The generator trailer 130 thus uses those hooks 320 intended for the installation mode as well as dedicated hooks 320 for the aviation mode. Likewise, the generator trailer 130 may be secured via the aircraft restraints 325. The generator trailer 130 also may include a pair or more of the winching shackles 380 positioned about the second end 200 thereof. As is shown in FIG. 12, the winching shackles 380 may be attached to the winching beam 390. The winching shackles 380 may be sized to be attached to a winch cable 395 so as to pull the generator trailer 130 into an aircraft and the like. As is shown, the winch cable 395 may pull the generator trailer 130 into the aircraft at an angle 385. Other components and other configurations may be used herein.

Figure 13:
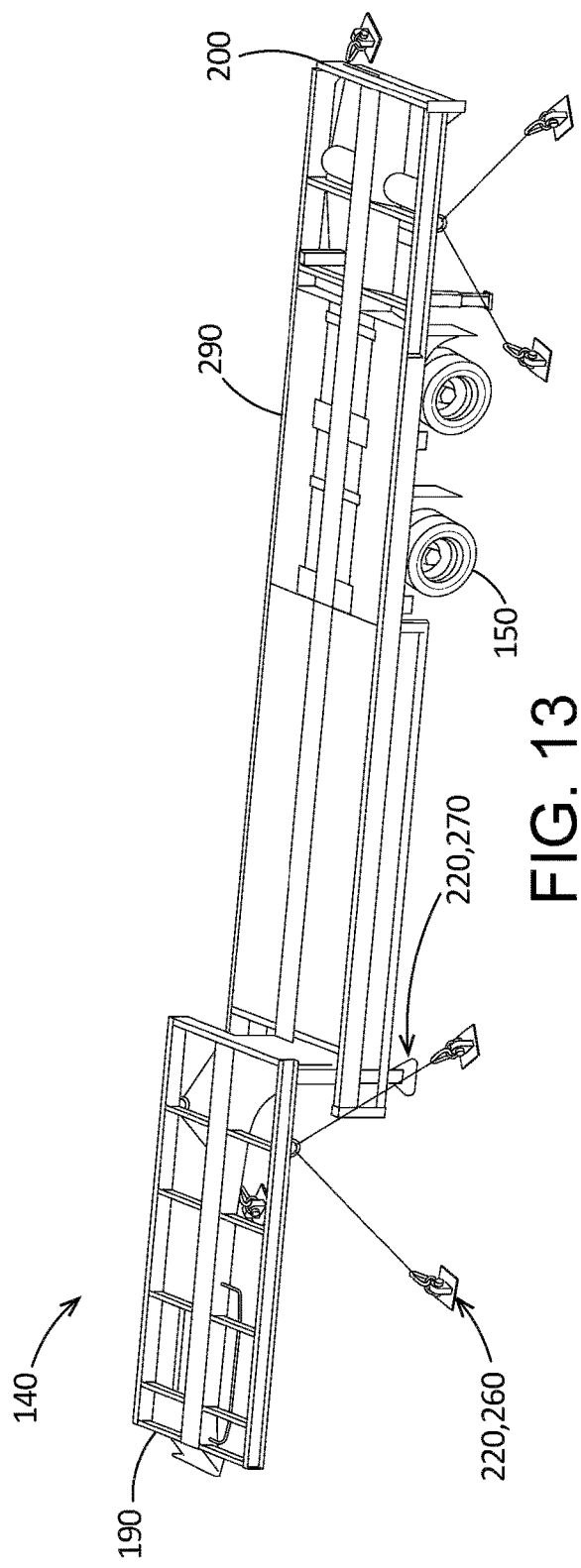
FIG. 13 is a perspective view of a control house trailer of the mobile power plant in installation mode.

FIG. 13 shows the control house trailer 140 at the installation site, i.e., in installation mode. The control house trailer 140 also may use a number of the tensile restraints 260. As described above, the tensile restraints 260 may include the turnbuckles 310. The control house trailer 140 may have a number of the hooks 320 or other structures welded to the deck 290 or adjacent thereto. The turnbuckles 310 may be attached to the hooks 320 and to the anchor plates 340 and tightened. Any number of the tensile restraints 260 may be used herein. Likewise, the control house trailer 140 also may use a number of the fastened restraints 270 or similar structures. Other configurations and other components may be used herein.

Figure 14:
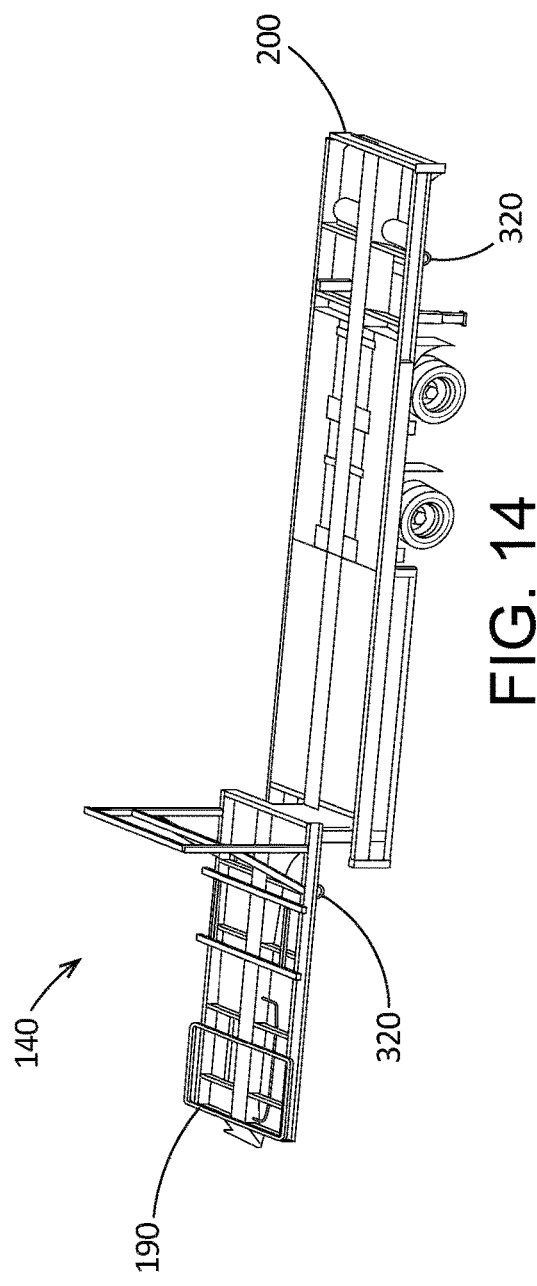
FIG. 14 is a perspective view of the control house trailer of the mobile power plant in aviation mode.

FIG. 14 shows the control house trailer 140 in an aircraft, i.e., in aviation mode. The control house trailer 140 may use several of the hooks 320 welded thereto as lashing points within the aircraft. The control house trailer 140 thus uses those the hooks 320 intended for installation mode as well as dedicated hooks 320 for aviation mode. Likewise, the control house trailer 140 may be secured via the aircraft restraints 325 and the like. Other components and other configurations may be used herein.

Figure 15:
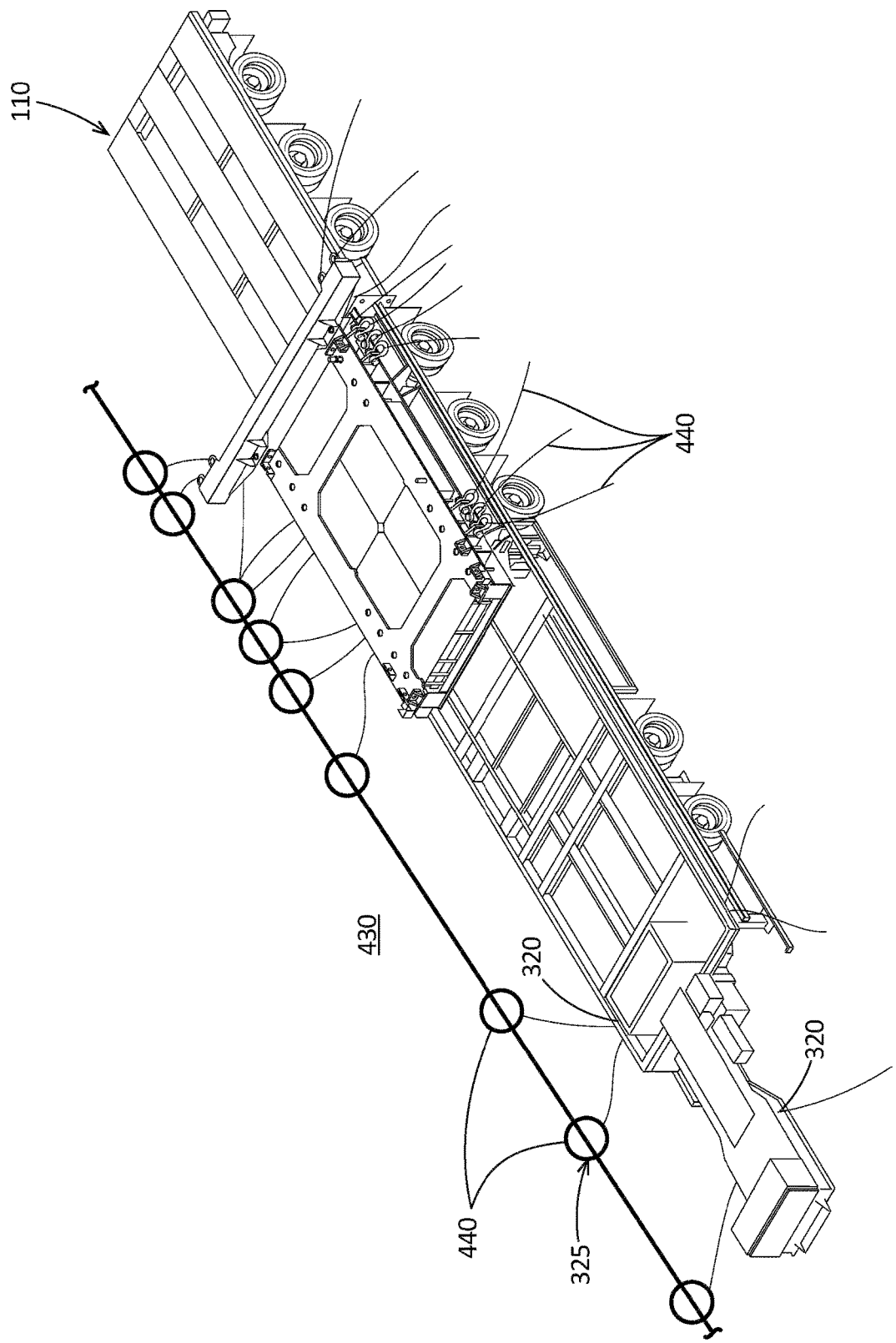
FIG. 15 is a perspective view of a trailer secured within an aircraft for transport.

FIG. 15 shows one of the trailers 110 in aviation mode on an aircraft 430. In addition to the tensile restraints 260 and the fastened restraints 270, the trailers 110 also may be secured with a number of the aircraft restraints 325. The aircraft restraints 325 may be the turnbuckles 310 and/or the cables 440 connected on one end to the hooks 320 on the trailers 110 and to aircraft hooks 450 positioned within the hold of the aircraft 430. Any number of the aircraft restraints 325 or other types of securing devices may used herein. Other components and other configurations may be used herein.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A mobile power plant system for loading power generation equipment into an aircraft via a winch cable and secured within the aircraft via a number of aircraft restraints, comprising: a trailer with the power generation equipment thereon; a plurality of hooks attached to the trailer; a winching beam attached to the trailer; and one or more winching shackles attached to the winching beam; wherein the winch cable may be attached to the one or more winching shackles to pull the trailer into the aircraft and wherein the number of aircraft restraints may be attached to the plurality of hooks to secure the trailer in the aircraft.

2. The mobile power plant system of any preceding clause, wherein the trailer comprises a turbine trailer.

3. The mobile power plant system of any preceding clause, wherein the trailer comprises a generator trailer.

4. The mobile power plant system of any preceding clause, wherein the trailer comprises a control house trailer.

5. The mobile power plant system of any preceding clause, wherein the trailer comprises a plurality of trailers.

6. The mobile power plant system of any preceding clause, wherein the one or more winching shackles comprise a plurality of winching shackles.

7. The mobile power plant system of any preceding clause, wherein the winch cable attached to the one or more winching shackles pulls the trailer into the aircraft at an angle.

8. The mobile power plant system of any preceding clause, wherein the trailer comprises a plurality of restraint assemblies.

9. The mobile power plant system of any preceding clause, wherein the plurality of restraint assemblies comprises a tensile restraint.

10. The mobile power plant system of any preceding clause, wherein the tensile restraint comprises a turnbuckle.

11. The mobile power plant system of any preceding clause, wherein the turnbuckle is attached to one of the plurality of hooks.

12. The mobile power plant system of any preceding clause, wherein the plurality of restraint assemblies comprises a fastened restraint.

13. The mobile power plant system of any preceding clause, wherein the fastened restraint comprises one or more rigid members.

14. The mobile power plant system of any preceding clause, wherein the trailer comprises a deck and a plurality of wheels.

15. A method of transporting a mobile power plant system to a remote location, comprising: winching a trailer of the mobile power plant system into an aircraft; securing the trailer with a number of aircraft restraints within the aircraft; driving the trailer to the remote location; and securing the trailer to a foundation of the remote location via a plurality of turnbuckles attached to the trailer and to the foundation.

16. A mobile power plant system for transporting power generation equipment via an aircraft and securing the power generation equipment at a remote location, comprising: a trailer with the power generation equipment thereon; a plurality of hooks attached to the trailer; a winching beam with one or more winching shackles attached to the trailer; and a tensile restraint with a turnbuckle attached to each of the plurality of hooks; wherein a winch cable may be attached to the one or more winching shackles to pull the trailer into the aircraft and wherein the tensile restraint with the turnbuckle secures the trailer to the remote location.

17. The mobile power plant system of any preceding clause, wherein the trailer comprises a turbine trailer.

18. The mobile power plant system of any preceding clause, wherein the trailer comprises a generator trailer.

19. The mobile power plant system of any preceding clause, wherein the trailer comprises a control house trailer.

20. The mobile power plant system of any preceding clause, wherein the trailer comprises a plurality of trailers.

We claim:

1. A mobile power plant system for loading power generation equipment into an aircraft via a winch cable and secured within the aircraft via a number of aircraft restraints, comprising:
   a trailer with the power generation equipment thereon;
   a plurality of hooks attached to the trailer;
   a winching beam attached to the trailer; and
   one or more winching shackles attached to the winching beam;
   wherein the winch cable may be attached to the one or more winching shackles to pull the trailer into the aircraft and wherein the number of aircraft restraints may be attached to the plurality of hooks to secure the trailer in the aircraft.

2. The mobile power plant system of claim 1, wherein the trailer comprises a turbine trailer.

3. The mobile power plant system of claim 1, wherein the trailer comprises a generator trailer.

4. The mobile power plant system of claim 1, wherein the trailer comprises a control house trailer.

5. The mobile power plant system of claim 1, wherein the trailer comprises a plurality of trailers.

6. The mobile power plant system of claim 1, wherein the one or more winching shackles comprise a plurality of winching shackles.

7. The mobile power plant system of claim 1, wherein the winch cable attached to the one or more winching shackles pulls the trailer into the aircraft at an angle.

8. The mobile power plant system of claim 1, wherein the trailer comprises a plurality of restraint assemblies.

9. The mobile power plant system of claim 8, wherein the plurality of restraint assemblies comprises a tensile restraint.

10. The mobile power plant system of claim 9, wherein the tensile restraint comprises a turnbuckle.

11. The mobile power plant system of claim 10, wherein the turnbuckle is attached to one of the plurality of hooks.

12. The mobile power plant system of claim 8, wherein the plurality of restraint assemblies comprises a fastened restraint.

13. The mobile power plant system of claim 12, wherein the fastened restraint comprises one or more rigid members.

14. The mobile power plant system of claim 1, wherein the trailer comprises a deck and a plurality of wheels.

15. A method of transporting a mobile power plant system to a remote location, comprising:
   winching a trailer of the mobile power plant system into an aircraft via a winch cable attached to one or more winching shackles of a winch beam;
   securing the trailer with a plurality of aircraft restraints within the aircraft;
   driving the trailer to the remote location; and
   securing the trailer to a foundation of the remote location via a plurality of turnbuckles attached to the trailer via a plurality of hooks and to the foundation.

16. A mobile power plant system for transporting power generation equipment via an aircraft and securing the power generation equipment at a remote location, comprising:
   a trailer with the power generation equipment thereon;
   a plurality of hooks attached to the trailer;
   a winching beam with one or more winching shackles attached to the trailer; and
   a tensile restraint with a turnbuckle attached to each of the plurality of hooks;
   wherein a winch cable may be attached to the one or more winching shackles to pull the trailer into the aircraft and wherein the tensile restraint with the turnbuckle secures the trailer to the remote location.

17. The mobile power plant system of claim 16, wherein the trailer comprises a turbine trailer.

18. The mobile power plant system of claim 16, wherein the trailer comprises a generator trailer.

19. The mobile power plant system of claim 16, wherein the trailer comprises a control house trailer.

20. The mobile power plant system of claim 16, wherein the trailer comprises a plurality of trailers.

* * * * *